Nov. 6, 1951    K. RATH    2,573,729
SYSTEM OF PHOTOELECTRIC EXPOSURE CONTROL
Filed May 26, 1948    3 Sheets-Sheet 1

INVENTOR.
Karl Rath

Nov. 6, 1951 K. RATH 2,573,729
SYSTEM OF PHOTOELECTRIC EXPOSURE CONTROL
Filed May 26, 1948 3 Sheets-Sheet 2

INVENTOR.

Nov. 6, 1951  K. RATH  2,573,729
SYSTEM OF PHOTOELECTRIC EXPOSURE CONTROL
Filed May 26, 1948  3 Sheets-Sheet 3

INVENTOR.

Karl Rath

Patented Nov. 6, 1951

2,573,729

UNITED STATES PATENT OFFICE 2,573,729

SYSTEM OF PHOTOELECTRIC EXPOSURE CONTROL

Karl Rath, New York, N. Y.

Application May 26, 1948, Serial No. 29,314

3 Claims. (Cl. 95—10)

The present invention relates to photoelectric exposure meters and control devices for cameras or the like, more particularly to exposure controls of the type comprising a photovoltaic or self-generating light-sensitive device capable of directly converting light energy into electrical energy and adjustable means associated therewith for selectively distributing the energy generated upon various exposure determining factors or controls of a camera, such as shutter speed, lens aperture and film speed or sensitivity, to result in a correctly exposed photograph.

A disadvantage inherent in self-generating photovoltaic cells of the dry-disk or barrier-layer type, such as the copper-copper oxide or iron-selenium type cells, is the fact that due to their involved internal characteristics a direct coupling or correlation of the output current generated with the various camera controls involves a number of difficulties which may be overcome only by special design and with the aid of elaborate auxiliary or compensating devices.

An object of the present invention is therefore to provide an improved exposure-control of the above type which is both simple in design as well as easy and reliable in operation; which may be manufactured at reduced cost compared with exposure control devices at present known in the art; and which will insure a correct exposure under most practical conditions, substantially without the difficulties heretofore experienced with photographic exposure control devices.

Further objects and novel aspects of the invention will in part become apparent and will in part be particularly pointed out as the following detailed description proceeds, reference being had to the accompanying drawings forming part of this specification and wherein.

Like reference numerals identify like parts throughout the different views of the drawings.

Figure 1:
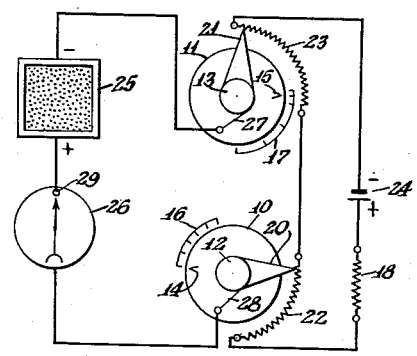
Figure 1 is a basic circuit diagram of a semi-automatic exposure control system for photographic cameras constructed in accordance with the principles of the invention.

Referring to Figure 1, there are shown diagrammatically at 10 and 11 the usual controls of a camera, that is, the exposure time or shutter speed and the lens aperture or the lens speed controls which may be in the form of control knobs 12 and 13 or the like and are provided with pointers or index marks 14 and 15 arranged to cooperate with the shutter speed and lens speed scales 16 and 17, respectively.

Control members 12 and 13, in addition to serving as means for adjusting the camera controls are furthermore provided or coupled with sliding contacts 20 and 21 of a pair of variable electrical potentiometer resistors 22 and 23, respectively, which may be of the rotary wire-wound or any other suitable type known in the art. Potentiometer resistors 22 and 23 are connected in series with each other and shunted across a source of fixed electrical potential 24 such as a standard dry cell or battery as used in flashlights or the like. A photovoltaic cell 25 in series with a microammeter type current indicator 26 is connected to the sliding contacts 20 and 21 of the resistors 22 and 23 by way of slip ring connectors 27 and 28 or in any other suitable manner. A further fixed resistor 18 may be connected in series with the battery 24 and the potentiometer resistors 22 and 23 to obtain a predetermined potential difference across the potentiometer terminals comprising resistors 22 and 23. Indicator 26 has an index or adjusting mark 29 preferably corresponding to the zero or null position of its pointer or indicator needle.

Figure 2:
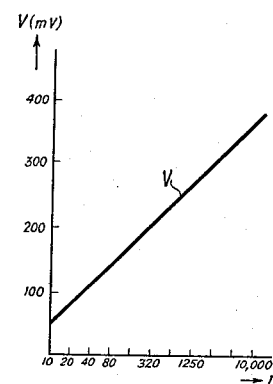
Figure 2 is a graph explanatory of the function and operation of the invention.

The operation and function of an exposure control system according to Figure 1 will be explained in the following with reference to Figure 2. The latter shows the potential V generated by the photovoltaic cell 25 as a function of the light intensity or illumination I. The operating range is shown to comprise values from 10 to 10,000 foot-candles as encountered in practice in connection with the average photographic scene or subject. The potential V generated and shown in millivolts, increases in a known manner logarithmically as a function of the illumination, that is, the curve V follows a substantially straight line if the illumination is plotted on a logarithmic scale as shown in the drawing.

According to the present invention, the generated potential V of the photovoltaic cell 25 is measured potentiometrically by counterbalancing it by the adjustment of the variable potentiometer resistors 22 and 23 coupled with the camera controls until the current through the meter 26 reaches zero as indicated by the index or adjusting mark 29. As a result of this balancing or compensating action, the potential generated by the photovoltaic cell will be balanced by the combined voltage drops through the adjustable portions of the resistors 22 and 23, provided that the photovoltaic cell 25 and battery 24 or other source of fixed potential are connected in opposing polarity relation, as shown in the drawing.

Since the relative voltage drops through resistors 22 and 23 are directly proportional to the adjusted resistance values and since, furthermore, the usual adjustments or settings of the camera controls as indicated by the scales 16 and 17 also are of a logarithmic character, i. e. with the change from one to the next scale division representing a change to twice or half the previous exposure, proper correlation will exist enabling a selective distribution of the light intensity I upon the exposure controls of the camera.

All that is necessary in practice in operating an exposure control device of this type is to select or preset one of the camera adjustments, say a shutter speed of 1/50th sec. by setting the control member 12 to a position where the index 14 is opposite to the proper shutter speed number on scale 16, whereupon the other control, that is the lens speed adjusting member 13, is moved to a point where the pointer of the meter 26 coincides with the index 29. As a result, the lens speed or aperture will be adjusted to their proper values to insure a correct exposure for other given secondary exposure controlling factors, such as film speed or emulsion sensitivity.

In case of a non-linear relation for one of the adjustments of the camera, such as in the case of the lens aperture control 11, as indicated by the scale 17 in the drawing, the associated potentiometer resistance 23 is advantageously so designed such as by varying the cross-section of successive winding turns or by varying the spacing of adjacent turns, etc. that equal resistance changes will be correlated with or result in equal changes of exposure.

An advantage of the invention is due to the fact that the meter 26 being used for zero current indication only, may be of small size and rugged design, a feature of great importance in keeping the bulk and weight of a camera at a minimum.

Figure 3:
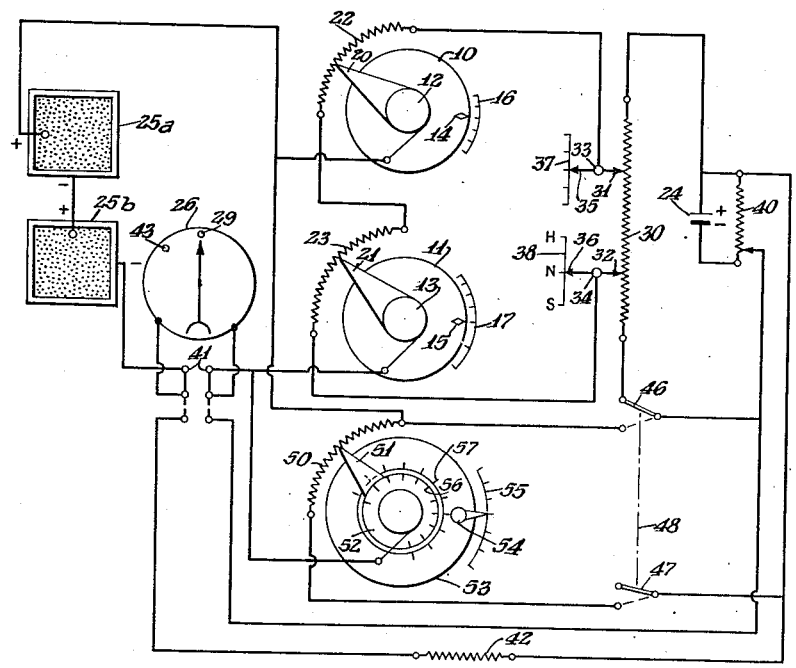
Figure 3 shows a more elaborate electrical circuit diagram of an exposure control system according to the invention suitable for structural embodiment in a camera.

Referring to Figure 3 there is shown a more complete diagram of an exposure control system according to the invention and suitable for structural embodiment in a camera, as shown more clearly in Figures 5 and 6 to be described hereinafter. In order to increase the response sensitivity of the meter 26 or to enable the use of a meter of reduced size and weight, two photovoltaic cells 25a and 25b suitably mounted upon the camera are shown to have their output voltages combined by connecting them in series. There is, furthermore, shown an auxiliary potentiometer resistance 30 connected across the battery 24 and having a pair of adjustable contacts 31 and 32 provided with operating members 33 and 34 and being connected to the outer ends or terminals of the main potentiometer comprising the control resistors 22 and 23, respectively.

Control members 33 and 34 are each provided with a pointer or index 35 and 36 arranged to cooperate with scales 37 and 38, respectively, which may represent additional exposure controlling factors. Thus, scale 37 may represent varying film or emulsion speeds according to any known system, while scale 38 in the example shown comprises three index marks H, N and S used for selective scene or subject brightness measurement based on the highlight, mid-tone or the shadow portions, respectively, of a scene as will more clearly be described and explained in the following.

There is furthermore shown in Figure 3 a simple testing arrangement for checking and/or readjusting the voltage supplied by the battery 24, inasmuch as the accuracy of the potentiometric light measurement depends upon the constancy of the operating voltage for which the system is designed. For this purpose, battery 24 is shunted by a further adjustable potentiometer resistance 40 for correcting slight variations of the battery voltage due to different makes, aging and other causes. In order to check or readjust the voltage impressed upon the adjustable potentiometer, there is provided a double-throw test switch 41 associated with the photovoltaic cell and the meter circuit, which switch in the test position, as indicated by dotted lines in the drawing, serves to disconnect the meter 26 from the photocell circuit and to connect the meter directly across the adjusting potentiometer 40 through a further fixed resistance 42. The latter is so designed that the meter 26 will be deflected to a predetermined point indicated by an additional index or test mark 43, if the voltage supplied by the potentiometer 40 corresponds to the proper operating voltage of the system.

If, upon operation of the switch 41 to the test position such as by operating a push button or the like, meter 26 is deflected to a point different from the index mark 43, potentiometer 40 is readjusted to a point as to cause the indicator pointer to coincide with the mark 43, in which case the system will be in proper operating condition. In this manner, slight discrepancies or variations of the battery voltage may be corrected, whereby to improve the accuracy and reliability of the exposure control.

For practical reasons, it may be desirable to limit the semi-automatic exposure adjustment as described to a restricted range covering daylight and other normal conditions, and to resort to a manual exposure determination and adjustment for scenes of unusual character such as in case of indoors or artificial lighting. There is shown for this purpose in Figure 3 a further multiple switch indicated schematically at 48 and having switch elements 46 and 47, which, in the dotted position shown, serve to disconnect the battery 40 from the automatic control circuit and to connect a further variable auxiliary resistance 50 in series with the photovoltaic cells 25a and 25b, the meter 26 and the potentiometer resistance 40. Variable resistance 50 has an adjusting contact 51 associated with an operating member 52 in the form of a knob or the like and mounted within a ring-shaped adjustable scale member 53 provided with an adjusting knob 54. The latter has an index or pointer arranged to cooperate with a fixed or stationary scale 55. Scale members 52 and 53 are provided with cooperating scales 56 and 57, respectively, representing lens and shutter speeds, while scale 55 may be calibrated in additional exposure controlling values, preferably film or emulsion speed numbers.

The design of this manual exposure meter is such that, upon adjustment or setting of scale member 53 for a given film speed as shown on scale 55, control resistance 50 when adjusted to a point where the pointer of the meter 26 coincides with the index 29, will result in the scales 56 and 57 being properly relatively aligned so as to enable the selection or reading of any desired pair of correlated lens and shutter speeds for manual setting of the camera controls.

Figure 4:
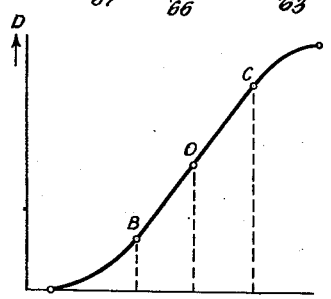
Figure 4 is a further graph illustrative of an improved feature of the invention.

Photovoltaic cells of the type shown and usually provided with a suitable baffle in order to restrict their acceptance angle to coincide with the field or view angle of a camera, measure the total or integrated brightness of a scene or subject, which measurement if used as a basis for the design of the exposure control will insure a correct exposure only in cases of so-called "average" scenes wherein the relative bright and dark areas are substantially equal by placing or anchoring the exposure upon the center point O of the density D—log E curve of the negative emulsion used and shown in Figure 4. On the other hand, with so-called "background" scenes, wherein a preferred object of relatively small area is set off against a pictorially less important background of relatively different brightness and larger area, a light measurement based on the total or integrated brightness may result in substantial over or under exposure by the light areas swamping the dark areas, or vice versa.

It has already been suggested in the latter case to base the light measurement upon the shadow or highlight portion of a pictorially important subject only by approaching the scene so as to exclude the other portions such as the background or by a control of the meter acceptance angle. In such a case, a correction should be made in the final exposure indication, whereby to return the exposure adjustment to the center point O of the characteristic curve for which the meter has been designed. In case of negative films, this may be accomplished by exposing on the shadow portions (point B of the curve in Figure 4) and in case of positive or reversal film, by exposing on the highlights (point C of the curve in Figure 4) and by increasing the exposure in the first place and decreasing it in the second place by a factor of about eight times for the average emulsion to obtain a proper exposure based on the center of the curve.

In the arrangement according to Figure 3, this correction is obtained in a simple manner by adjusting knob 34 to any of the index marks H, N and S corresponding to selective exposures on the highlights, on the mid-tones and on the shadows, respectively.

Figure 5:
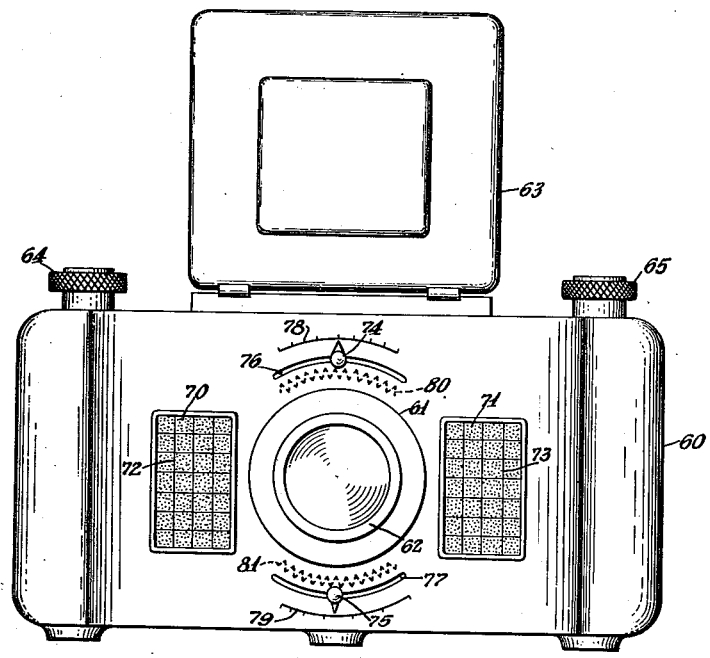
Figure 5 is a front view of a photographic camera construction embodying an exposure control apparatus of the type according to Figure 3.
Figure 6:
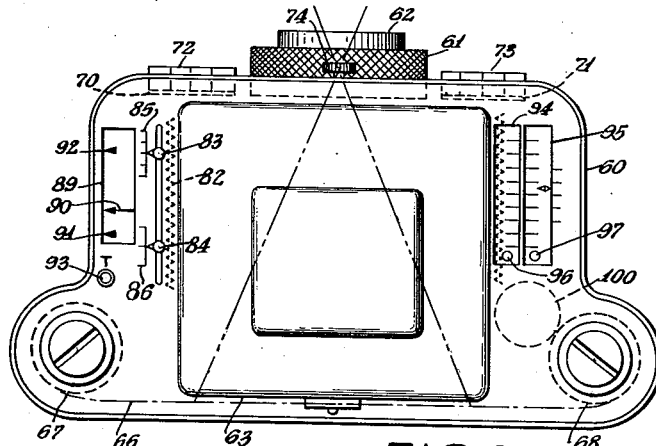
Figure 6 is a top view of the camera shown in Figure 5.

Referring to Figures 5 and 6, there is shown by way of example a camera of the well-known reflex type embodying an exposure control arrangement of the type shown in Figure 3. The camera comprises a body 60, a shutter 61, a lens 62, a collapsible viewing or focussing hood 63 shown in the extended or operative position in Figure 5, a pair of film winding and unwinding knobs 64 and 65 for moving a film 66 from a supply spool 67 onto a take-up spool 68 through the film or picture gate of the camera, all these elements and other details not shown being of standard design and construction well known to those skilled in the art.

Items 70 and 71 are a pair of photovoltaic cells such as of the known selenium type provided with suitable light baffles 72 and 73 in the form of grilles or the like to restrict their acceptance to a value equal to or less than the field angle of the camera lens 62. Items 74 and 75 are the adjusting knobs for the lens and shutter speed controls which are coupled with the variable control or potentiometer resistors 80 and 81 and arranged to cooperate with the exposure indicating scales 78 and 79, respectively. Items 83 and 84 are the film speed controls and controls for the selective measurement based on various scene portions (shadow, mid-tone and highlight measurement) and coperating with suitable scales 85 and 86 by controlling the adjusting potentiometer 82 which corresponds to item 30 of Figure 3.

The current indicator is suitably mounted within the camera body with its pointer visible through an aperture or window 89 and moving over a dial plate provided with index marks 91 and 92 corresponding to the marks 29 and 43 of Figure 3. Item 93 shows the battery test-switch in the form of a pushbutton or the like. Scale members 94 and 95 having adjusting knobs 96 and 97, respectively are parts of the separate meter for effecting a manual exposure determination as described in connection with Figure 3 and item 100 indicates a dry cell supplying the operating potential which may suitably removably be mounted within the camera body by means of spring contacts, etc. in a manner customary with flashlights and similar electrical devices.

The photocells 25a and 25b in Figure 3 are shown connected in series, whereby twice the generated voltage will be available for the measurement, thus enabling the use of a less sensitive and more rugged and inexpensive instrument. Additional photocells may be provided or a single cell may be subdivided into a desired number of smaller units connected in series, to further increase the total voltage to be measured by the potentiometric circuit, the voltage generated by each cell or unit being independent of the areas of the cells, as is well known.

Figure 7:
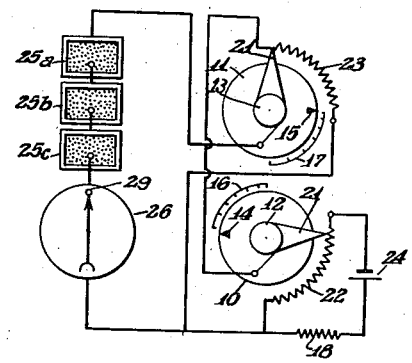
Figure 7 is a diagram similar to Figure 1 and showing a modification for effecting a semi-automatic exposure control.

Referring to Figure 7, there is shown a diagram of a modified semi-automatic exposure control system according to the invention. This arrangement, wherein three photocells 25a, 25b and 25c provided connected in series, differs from Figure 1 in that the operating or balancing voltage source 24 is shunted across only one of the control resistors 22 and 23 coupled with the shutter speed and lens speed adjustments of the camera. In the example shown, the source or battery 24 is shunted across the shutter speed resistor 22 in series with the voltage drop or bleeder resistance 18, while the control resistor 23 is shunted across the adjustable position of resistor 22 in series with the photocells 25a, 25b and 25c and the indicator 26. Thus, the compensating voltage drop through resistor 23 counter-balancing the voltage generated by the photocells in the zero or null position of the meter 26 will be proportional to the current through the parallel circuit comprised of the resistors 22 and 23. Since this current is in turn proportional to the voltage drop across 22, the compensating voltage counter-balancing the voltage generated by the photocells will be a function of the product of the resistances or adjusting values of 22 and 23. Accordingly, by an arrangement of this type, a given scene brightness may be selectively distributed upon the factors determining the exposure, in a manner which will be readily understood from the above.

Figure 8:
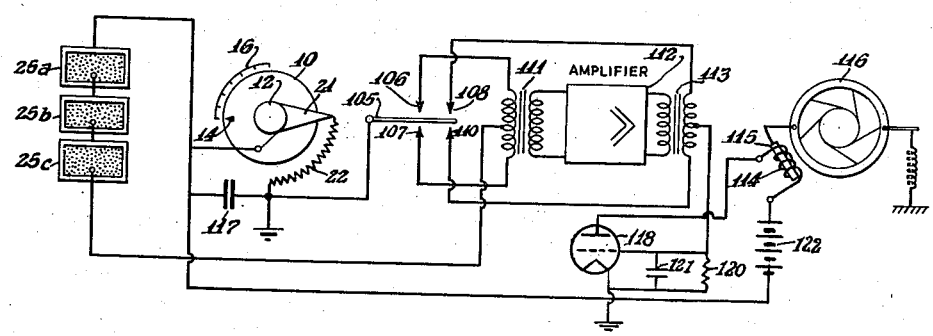
Figure 8 is a diagram illustrating a still further modification for effecting a fully automatic exposure control in accordance with the invention.

Referring to Figure 8, there is shown an arrangement for effecting a fully automatic potentiometric exposure control based upon a principle similar to that underlying the semi-automatic adjustment according to Figure 7. For this purpose, the voltage generated by the photocells 25a, 25b and 25c which are again connected in series is passed through the adjustable compensating resistor 22 coupled with the shutter speed control 12 and is periodically interrupted by means of a vibrator or equivalent interrupting device to convert it into an alternating voltage which may be stepped up by means of a transformer to a value sufficient for exciting the input for an electronic low frequency or audio amplifier. In an example shown, the interrupting vibrator is of the double acting type, comprising a vibrating reed 105 and a pair of cooperating contacts 106 and 107 alternately engaging said reed and being connected to the opposite terminals of the primary winding of the step-up transformer 111. One open terminal of the series connected photocells is connected to the reed 105 through the compensating resistor 22, while the other open terminal of the photocells is connected to the center point of the primary winding of the transformer 111, in the manner shown in the drawing. The reed 105 may be actuated in any known manner such as by means of a suitable cam driven by the motor of a motion picture camera in a manner described in my co-pending application Serial Number 639,064 filed January 4, 1946, now Patent Number 2,518,717, issued August 15, 1950, entitled "Automatic Exposure Control System" or a self-interrupting vibrator operated by a battery or other power source may be employed, as described in my U. S. Patent Number 2,412,424, issued December 10, 1946, and entitled "Photoelectric Control Device for Camera Diaphragms."

The current of increased voltage supplied by the secondary winding of the transformer 111 is amplified by means of a low frequency or audio amplifier 112, such as a miniature amplifier as used in connection with hearing aids, pocket radios or the like. The amplified current derived from the output transformer 113 is rectified and the rectified current utilized to energize the winding 114 of a magnetic plunger 115 arranged to control the iris diaphragm adjustment 116 of a camera. The latter may be either a still or a motion picture camera, as is understood. The rectified output current controlling the iris diaphragm is furthermore passed through the compensating resistance 22 in such a sense as to produce a voltage drop through the latter in opposition to and substantially balancing the voltage generated by the photocells. More particularly, in order to provide a steady balancing current, the rectified output current is used to control the input of an additional amplifier tube 118 by way of a grid coupling resistance 120 shunted by a bypass condenser 121 and connected between the center point of the secondary winding of the transformer 113 and ground in the example illustrated. The output current of tube 118 is passed through both the solenoid winding 114 and the compensating resistance 22 in series with a suitable plate voltage supply source, such as a battery 122.

In operation, the system will tend to maintain an equilibrium determined by the condition that the compensating voltage drop through the resistor 22 substantially counterbalances the voltage generated by the photocells, whereby the operating current for the diaphragm 116 and in turn the adjustment of the latter will be a function of the generated voltage or in turn the scene or object brightness, as will be understood. Adjustment of the compensating resistance 22 in accordance with the varying shutter speeds, results in a corresponding variation of the compensating current necessary to effect or maintain the voltage balance, thus in turn resulting in a corresponding change of the diaphragm adjustment by the solenoid 114 and plunger 115. It is thus seen that again, as in the case of Figure 7, a given scene brightness will be automatically distributed upon the exposure controls to result in a correctly exposed photograph. An advantage of a system shown in Figure 8 is the fact that a current meter or indicator is entirely dispensed with, resulting in a great simplification as well as increased ruggedness of the exposure control apparatus.

In an arrangement according to Figure 8 it is necessary that the direct current passed through the iris control winding 114 and the compensating resistor 22 varies in such a sense or direction, depending upon whether the generated photoelectric voltage increases or decreases in respect to the compensating voltage for any given equilibrium condition, that the ensuing unbalance or direct output current acts to control or rebalance the initial voltage change so as to restore the electrical equilibrium of the system. For this purpose a special synchronous rectifier and interrupter has been shown in Figure 8, comprising a pair of further contacts 108 and 110 cooperating with the reed 105 and being connected to the outer ends of the secondary winding of the output transformer 113, the rectified output current passing through the solenoid winding 114 and compensating resistor 22 being derived from the center point of the secondary winding of the output transformer on the one hand and from the reed 105 on the other, in the manner shown and readily understood from the drawing. A condenser 117 shunted across the balancing resistance 22 serves to smoothen out the ripples in the rectified current in a manner well understood. The operation of the system will be further understood from the following:

Let it be assumed that the system is in electrical equilibrium, i. e. that the generated photoelectric voltage is substantially balanced by the voltage drop through the resistor 22. If now the generated voltage, as a result of a change in scene brightness, increases in respect to the compensating voltage a current will flow in the primary circuit of the transformer 111 in a given direction, while if the generated voltage changes in the opposite direction, i. e. decreases below the compensating voltage, the current through the transformer primary will be in the opposite direction. Since this unbalance current is periodically interrupted by the contacts 106 and 107, the effect will be a secondary alternating current obtained from the output of the transformer 111 whose phase will be reversed by 180° depending upon the sense or direction of the unbalance between the generated and compensating voltages, as will be understood. The same phase relations apply to the amplified output current supplied by the transformer 113. This output current is rectified by the contacts 108 and 110 which are operated in rigid phase synchronism with the contacts 106 and 107, whereby the direction or polarity of the direct output current through the coupling resistor and in turn through the solenoid 114 and compensating resistance 22 will depend upon the phase of the alternating current, i. e. in turn upon the sense or direction of the initial unbalance between the generated and compensating voltages. In this manner, it is possible, by proper polarity connection of the operating contacts and other circuit elements to utilize the amplified output current as a means for automatically rebalancing the input voltage changes, for effecting an automatic diaphragm control in the manner described hereinbefore.

A further advantage of a system of this type is the fact that the amplifier 112 is called upon to operate only during the relatively short periods of unbalancing and rebalancing of the system, whereby the balancing operation will be continuous and substantially instantaneous and linearity and other varying operating conditions of the amplifier will not directly affect the operation of the system which is maintained at an inherently suitably balanced condition with only the output current subject to change in producing the off balance current flow.

While there have been shown and described in the foregoing a few desirable embodiments of the invention, it is understood that this disclosure is for the purpose of illustration and that various changes in size, shape and arrangement of parts or elements, as well as substitution of equivalent elements for those herein shown and described may be made without departing from the scope and spirit of the invention as defined in the appended claims. The specification and drawings are accordingly to be regarded in an illustrative rather than a limiting sense.

I claim:

1. In combination with a photographic camera having exposure time and lens aperture control means, a source of substantially constant potential, a self-generating barrier layer photoelectric cell, a current indicator connected in series with said cell to form a first branch circuit, a pair of potentiometer resistors connected in series to form a second branch circuit, contact means for each of said resistors, adjusting means each positively coupled with one of said control means for varying the relative adjustment of said resistors and associated contact means, circuit connections, said contact means and circuit connections electrically connecting both said branch circuits in parallel to said source, to counteract the voltage generated by said cell by the sum of the voltage drops through said resistors produced by the current from said source, whereby said resistors may be varied to balance the voltage in said circuit as shown by said indicator and set said exposure time and lens aperture control means.

2. In combination with a photographic camera having exposure time and lens aperture adjusting means, a source of substantially constant potential, a self-generating barrier layer photoelectric cell, a current indicator connected in series with said cell to form a first branch circuit, a pair of potentiometer resistors connected in series to form a second branch circuit, adjustable contact means for said resistors each positively coupled with one of said adjusting means, circuit connections, the contact means and circuit connections electrically connecting both said branch circuits in parallel to said source, to counteract the voltage generated by said cell by the sum of the voltage drops through said resistors produced by the current from said source, whereby the resistors may be varied to balance the voltage in the circuit as shown by said indicator and set the exposure time and lens aperture adjusting means.

3. In combination with a photographic camera having exposure time and lens aperture control means, a source of substantially constant potential, a plurality of self-generating barrier layer photoelectric cells connected in series in additive relation of the voltages generated by said cells, a current indicator in series with said photoelectric cells to provide a first branch circuit, a pair of potentiometer resistors connected in series to form a second branch circuit, contact means for each of said resistors, adjusting means each positively coupled with one of said control means for varying the relative adjustment of said resistors and associated contact means, circuit connections, said contact means and circuit connections electrically connecting both said branch circuits in parallel to said source, to counteract the total voltage generated by said cells by the sum of the voltage drops through said resistors produced by the current from said source, whereby said resistors may be varied to balance the voltage in said circuit as shown by said indicator and set the exposure time and lens aperture control means.

KARL RATH.

REFERENCES CITED

The following references are of record in the file of this patent:

UNITED STATES PATENTS

| Number | Name | Date |
| --- | --- | --- |
| 1,244,159 | Asdit | Oct. 23, 1917 |
| 1,974,433 | Riszdorfer | Sept. 25, 1934 |
| 2,354,544 | Rath | July 25, 1944 |
| 2,411,486 | Weisglass | Nov. 19, 1946 |
| 2,492,901 | Sweet | Dec. 27, 1949 |

FOREIGN PATENTS

| Number | Country | Date |
| --- | --- | --- |
| 446,016 | Great Britain | Apr. 22, 1936 |